US009137238B1

(12) United States Patent
Jakobsson

(10) Patent No.: US 9,137,238 B1
(45) Date of Patent: Sep. 15, 2015

(54) PASS-SEQUENCES

(75) Inventor: Bjorn Markus Jakobsson, Mountain View, CA (US)

(73) Assignee: RightQuestions, LLC, Portola Valley, CA (US)

( * ) Notice: Subject to any disclaimer, the term of this patent is extended or adjusted under 35 U.S.C. 154(b) by 277 days.

(21) Appl. No.: 13/025,403

(22) Filed: Feb. 11, 2011

Related U.S. Application Data

(60) Provisional application No. 61/371,565, filed on Aug. 6, 2010.

(51) Int. Cl.
| | |
|---|---|
| H04L 29/06 | (2006.01) |
| G06F 21/46 | (2013.01) |
| H04W 12/06 | (2009.01) |
| G06F 21/31 | (2013.01) |
| H04L 9/32 | (2006.01) |
| G06F 21/45 | (2013.01) |

(52) U.S. Cl.
CPC ............. *H04L 63/083* (2013.01); *G06F 21/31* (2013.01); *G06F 21/46* (2013.01); *H04L 9/3223* (2013.01); *H04W 12/06* (2013.01); *G06F 21/45* (2013.01); *H04L 9/3226* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 6,003,002 A * | 12/1999 | Netsch | .......................... | 704/236 |
| 6,691,089 B1 * | 2/2004 | Su et al. | ........................ | 704/244 |
| 2003/0135507 A1 * | 7/2003 | Hind et al. | .................... | 707/100 |
| 2006/0104515 A1 * | 5/2006 | King et al. | ..................... | 382/190 |
| 2007/0050191 A1 * | 3/2007 | Weider et al. | .................. | 704/275 |
| 2008/0091408 A1 * | 4/2008 | Roulland et al. | ................... | 704/9 |
| 2008/0144817 A1 * | 6/2008 | Brown et al. | .................... | 380/44 |
| 2009/0157588 A1 * | 6/2009 | Jivsov | ............................. | 706/48 |
| 2010/0185870 A1 * | 7/2010 | Rane et al. | ..................... | 713/184 |
| 2010/0228733 A1 * | 9/2010 | Harrison et al. | .............. | 707/739 |
| 2010/0314294 A1 * | 12/2010 | Siskin et al. | ................... | 208/134 |
| 2011/0055206 A1 * | 3/2011 | Martin et al. | ................. | 707/723 |
| 2011/0083172 A1 * | 4/2011 | Heim et al. | ....................... | 726/6 |
| 2011/0314294 A1 * | 12/2011 | McGrew et al. | .............. | 713/182 |

OTHER PUBLICATIONS

Bard, G. "Spelling-Error Tolerant, Order-Independent Pass-Phrases via the Damerau-Levenshtein String-Edit Distance Metric," Proceedings of the Fifth Australasian Information Security Workshop (Privacy Enahncing Technologies) (AISW 2007), 2007.*

Bard, G., "Spelling-Error Tolerant, Order-Independent Pass-Phrases via the Damerau-Levenshtein String-Edit Distance Metric," Proceedings of the Fifth Australasian Information Security Workshop (Privacy Enhancing Technologies) (AISW 2007), 2007.*

Spector, Y., Ginzberg, J., "Pass-sentence—a new approach to computer code," Computers & Security, vol. 13, Issue 2, Apr. 1994, Elsevier Science Ltd, pp. 145-160.*

Nielsen, G., Vedel, M., "Improving Usability of Passphrase Authentication," Masters Thesis, Kongens Lyngby, May 2009, IMM-M.Sc.-2009-25.*

(Continued)

*Primary Examiner* — Andrew Nalven
*Assistant Examiner* — Christopher Ruprecht
(74) *Attorney, Agent, or Firm* — Van Pelt, Yi & James LLP

(57) ABSTRACT

Authentication techniques, and in particular, authentication techniques which can be used in conjunction with input constrained devices are described herein. A plurality of words is received. The received words are parsed. A credential is authenticated by determining a match based on information associated with at least one of the received words in the plurality.

24 Claims, 15 Drawing Sheets

(56) References Cited

OTHER PUBLICATIONS

Nielsen, G., Vedel, M.; "Improving Usability of Passphrase Authentication"; Kongens Lyngby, Denmark 2009. IMM-M.Sc.-2009-25. May 2009.*

Bard, G., "Spelling-error tolerant, order-independent pass-phrases via the Damerau-Levenshtein string-edit distance metric", Proceedings of the Fifth Australasian Information Security Workshop (Privacy Enhancing Technologies) (AISW 2007), 2007.

* cited by examiner

Bob's Phone is Locked

Please select the correct words to unlock the phone.

tulip
stroke          strategic
        goat        umbrella
crater
            suitcase
    purple            muffin
        rope
                purple    ⟋ 1302
eagle       yes        frog
        sled
                    salad
            orbit
    monkey
        badger        zebra
egg
    running        taco

1300 ⟶            FIG. 13

Bob's Phone is Locked

Please select the correct words to unlock the phone.

dinosaur
red
                signal
    rogue silicon     Lisbon   slip   shrimp baguette
      archery    dashing
heard
               working —1402
   snow              cheese dog
baboon
                   salad
   touchdown

FIG. 14

Diary Application
Please fill in the blanks to gain access:
goat _____ upside _____ new _____
Q W E R T Y U I O P [ ] \
A S D F G H J K L ; '
Z X C V B N M , . /

PASS-SEQUENCES

CROSS REFERENCE TO OTHER APPLICATIONS

This application claims priority to U.S. Provisional Patent Application No. 61/371,565 entitled SECURE ERROR-CORRECTING PASS-SEQUENCES filed Aug. 6, 2010 which is incorporated herein by reference for all purposes.

BACKGROUND OF THE INVENTION

Providing authentication information, such as a password, on an input constrained device, such as a mobile telephone, is typically a tedious experience. A lack of a physical keyboard or the inclusion of a small keyboard generally means that users will be more prone to mistyping their entries than when providing the same information via a typical full-sized physical computer keyboard. Correctly typing an entry also typically takes significantly longer on an input constrained device than it does on a conventional physical computer keyboard.

Two ways that users attempt to compensate for the difficulties in providing authentication information are (1) the use a password manager and (2) the use of a shorter, easier to enter credential. Unfortunately, both "solutions" can be less secure than requiring that the user enter a typical, secure credential. If the credential is sufficiently annoying to provide, the user may forego use of the resource protected by the credential entirely.

Some input constrained devices attempt to compensate for the increased errors of users by making auto-completion or auto-correction suggestions. A strong password (e.g., including upper and lower case letters and at least one number) is often akin to a poorly spelled word—something an auto-correct feature would attempt to "correct." Unfortunately, if a secure password is entered when there is auto-correction or auto-completion present, initial password entry will be more difficult than where such schemes are not used, since most suggestions would be likely to be incorrect and the user would have to say no to them. If the local dictionary of the auto-corrector learns the password (as it learns new words typed by users), then this degrades security. For example, the password would be stored in plaintext in the local dictionary.

BRIEF DESCRIPTION OF THE DRAWINGS

Various embodiments of the invention are disclosed in the following detailed description and the accompanying drawings.

FIG. 13 illustrates an embodiment of an interface.

FIG. 14 illustrates an embodiment of an interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
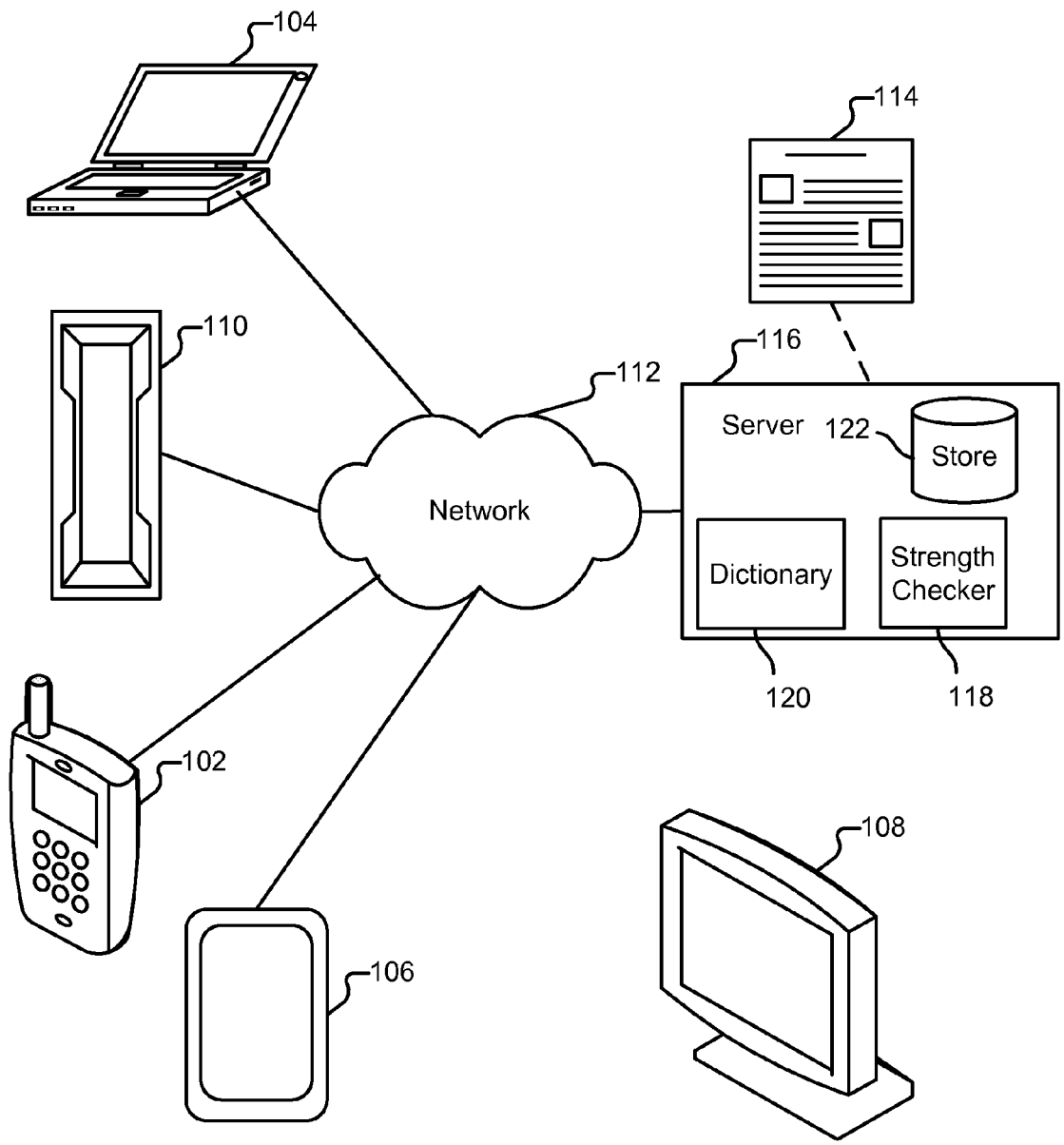
FIG. 1 illustrates an embodiment of an environment in which authentication is provided.

FIG. 1 illustrates an embodiment of an environment in which authentication is provided. In the example shown, two users (hereinafter referred to as "Alice" and "Bob") use a variety of devices 102-110 to access resources. Alice owns a mobile phone 102 (which includes a small keypad, but could also include a touch-screen keyboard), a laptop 104 (which includes a typical laptop keyboard, but could also include a touch-screen keyboard), and a conventional telephone 110 (without a display). She uses each of the devices to access information associated with bank accounts that she holds with her bank, ACME Bank. Specifically, she uses her laptop 104 to access the bank's web page 114 (served by server 116) via a web browser application. She can also access the bank's web page 114 via a web browser application installed on her mobile phone 102, but prefers instead to access bank information and other services via a custom banking application installed on her phone. Finally, she sometimes uses telephone 110 to check the balance of her accounts with ACME Bank via an interactive voice response (IVR) interface provided by the bank (not shown). Bob also banks with ACME Bank and uses his touch-screen-based mobile phone to access banking resources via a mobile web browser application. Bob's mobile phone has a variety of other applications installed on it as well, including a secure screen lock application and a diary application.

As will be described in more detail below, each of the aforementioned devices can make use of the techniques described herein to provide users with the ability to securely authenticate themselves to gain access a variety of resources. In particular, in various embodiments, users of input-constrained devices are able to take advantage of error-correction features offered by (or to) such devices without compromising security.

Figure 9:
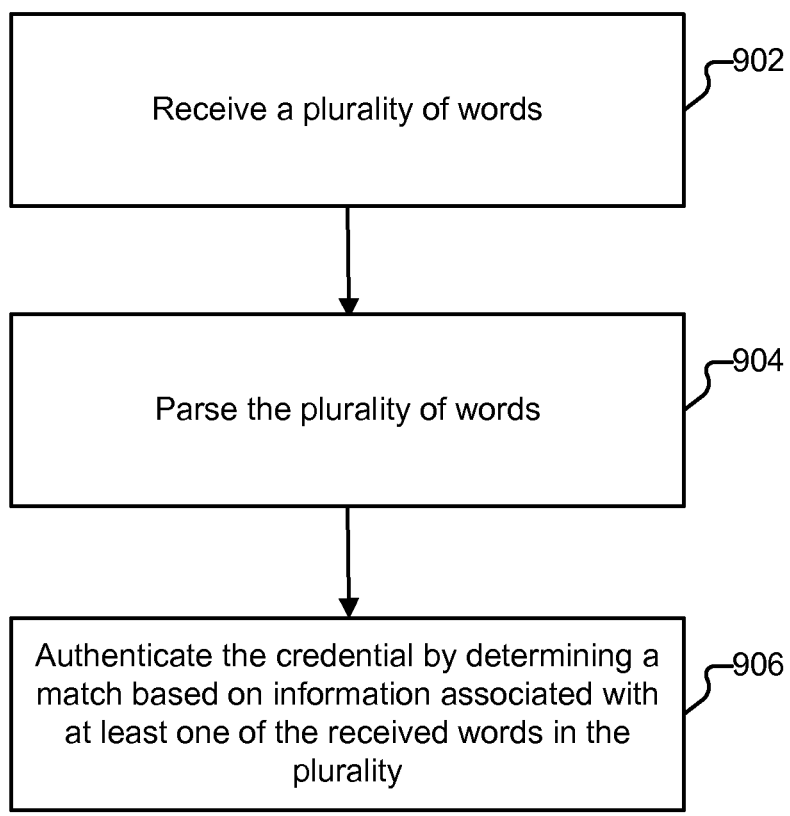
FIG. 9 is a flow chart illustrating an embodiment of an authentication process.

Each of devices 102, 104, 106, and 110 can connect, via one or more networks (represented herein collectively as cloud 112), to remote resources requiring authentication such as website 114. The authentication techniques described herein can also be used to gain access to resources that are local to the device, and devices need not have or make use of network connections in order to benefit from the techniques described herein. For example, Bob's screen lock application prevents other individuals from accessing his phone and need not make use of network 112 to do so. As another example, device 108 is a touch-screen based console to a medical device. Bob, a cardiologist, can use console 108 to reprogram patients' pacemakers. Access to console 108 is restricted to users presenting appropriate credentials in accordance with the techniques described herein. When a device (e.g., device 108 or device 106) is performing authentication processes such as are shown in FIG. 9, although not shown in FIG. 1, that device may include or otherwise make use of components that perform tasks discussed in conjunction with the operation of server 116 (e.g., strength checker 118, dictionary 120, and database 122).

Other devices not illustrated in FIG. 1 can also use the techniques described herein, as applicable, such as personal digital assistants, gaming consoles, and set top boxes. Other resources not illustrated in FIG. 1 can likewise use the techniques described herein, as applicable, such as motor vehicle door and ignition locks, automatic teller machines, kiosks, and point of sale terminals.

Figure 2:
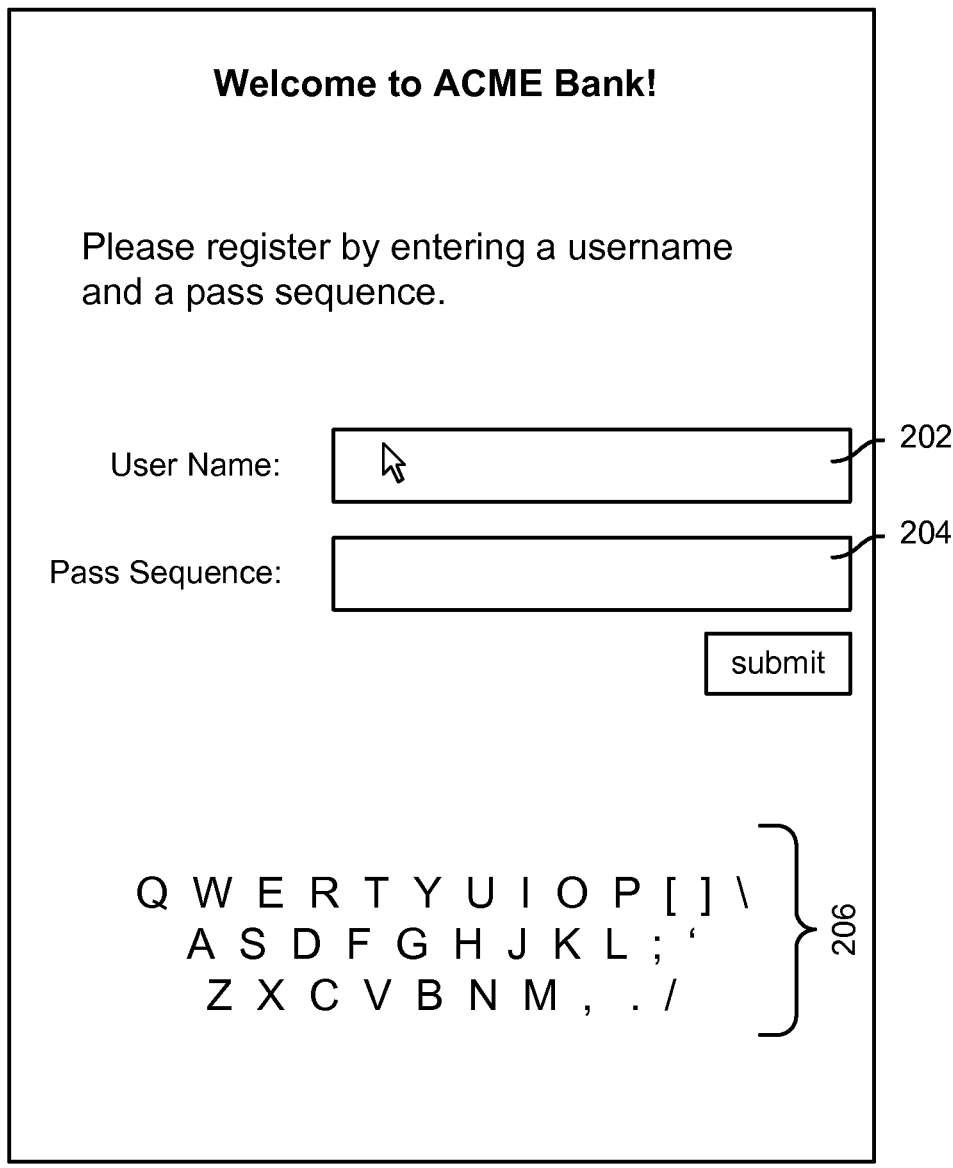
FIG. 2 illustrates an embodiment of an interface.

FIG. 2 illustrates an embodiment of an interface. Suppose Bob is an existing customer of ACME Bank, but has never accessed website 114 (either via device 106 or any other device). Bob would like to establish an account and is presented with an interface such as interface 200 after selecting a "sign up for online account access" link provided by website 114. Bob is prompted to enter a user name in region 202 and a pass sequence in region 204. As used herein, a "pass sequence" (also referred to as a "fastword") is a plurality of words. One example of a pass sequence is "frog work flat," a sequence of three distinctly parseable words—"frog," "work," and "flat." Bob enters his selected user name and pass sequence via an on-screen keyboard 206. In the example shown, Bob has selected the words that comprise his fastword by thinking of a fictitious story: "I ran over a frog on my way to work, and now I have a flat frog under the tire." In various embodiments, Bob is presented with the interface shown in FIG. 2 the first time he attempts to access website 114 via a mobile device, despite the fact that he might already hold more conventional login credentials from previous access to website 114 via a web browser on a desktop computer. As one example, Bob might be prompted to replace (or add as an acceptable alternate credential to) his existing credential with a "mobile friendly" credential.

Figure 3:
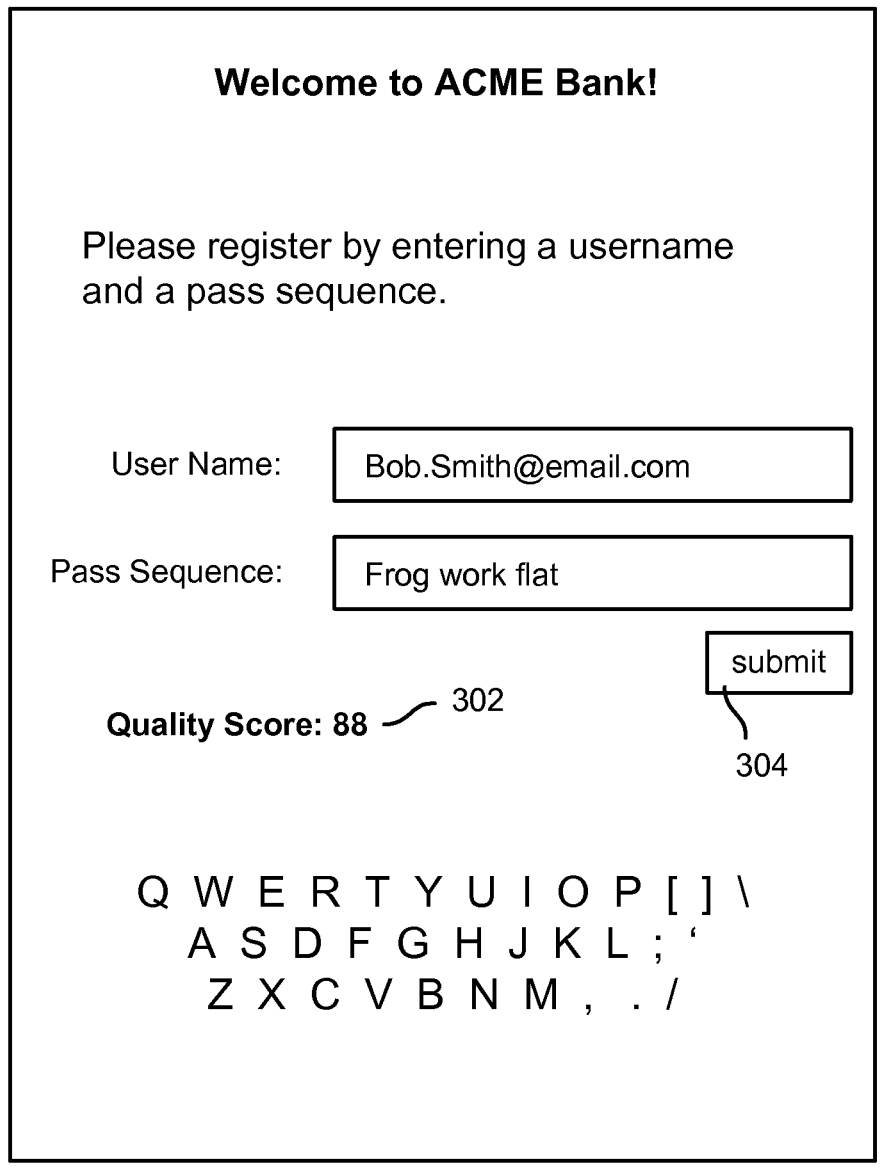
FIG. 3 illustrates an embodiment of an interface.

FIG. 3 illustrates an embodiment of an interface. In the example shown, Bob has provided his selected fastword, "frog work flat." Also shown in FIG. 3 is a quality indicator 302. Techniques for determining the quality of a selected fastword are provided in more detail below. In some embodiments the quality indicator is displayed after Bob elects to submit his registration information (by clicking on button 304). In other embodiments, the quality indicator is dynamically updated as Bob enters his words. As illustrated, the indicator is a score from 1 to 100. Other indicators of the quality of Bob's chosen pass sequence can also be provided in interface 300, such as a color indicator (e.g., that changes from red to green), or specific feedback (e.g., "your pass sequence cannot include two nouns in a row" and "your pass sequence cannot include the name of a person"). In various embodiments, quality indicator 302 is omitted.

Figure 4:
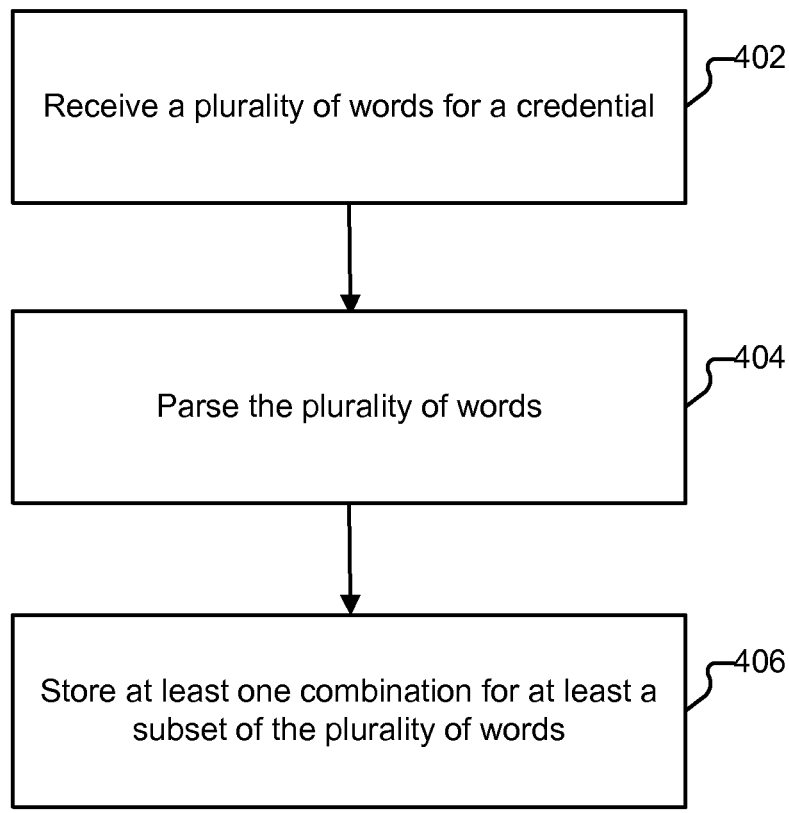
FIG. 4 is a flow chart illustrating an embodiment of an enrollment process.

FIG. 4 is a flow chart illustrating an embodiment of an enrollment process. In various embodiments, the process shown in FIG. 4 is performed by a system such as server 116. The process begins at 402 when a plurality of words for a credential is received. As one example, at 402, Bob's entry of "frog work flat" is received by server 116 when Bob selects submit button 304. The plurality of words may be received at the same time (e.g. as when Bob selects the submit button) and may also be received one at a time (e.g., where JavaScript is employed to transmit each word in sequence, without the use of a submit button). At 404, the plurality of words is parsed. A variety of checks, described in more detail below, can be performed at 404. Examples include confirming that the words do not appear on a blacklist, that the words have a sufficiently high entropy, that a sufficient number of words is received, and that the words are of a sufficient length (either individually or collectively). At 406, at least one combination for at least a subset of the plurality of words is stored, e.g., in database 122. For example, assuming that the words provided by Bob pass any checks performed at 404, at 406 his selected words are stored as a credential. Bob may also enter a short story which the system parses, and from which a collection of words are selected during the setup process: these words are collectively the fastword. Bob can then be told which words in his story are important for him to remember. This avoids user-guided selection of words that are commonly replaceable. For example, the story "My sister fell over my parked bike, and broke her leg," could be parsed and the words "sister bike leg" selected by the system. This simplifies the effort to users who may otherwise choose poor keywords from otherwise good mnemonics. For example, the three words "my and her" (also extractable from the story) are not a good fastword. Linguistic analysis of suitable words can guide the selection of words from sentences.

One way of storing a credential is as follows: if the credential is a k-tuple of words, $W=(w1, w2, \ldots wk)$, then $hash(W, salt)$ is stored, along with the random value salt. Here, hash is a cryptographic one-way function, such as SHA-1, and salt can be a random or unique value selected by the system as the record is created. In various embodiments, normalization is performed (e.g., for robustness, and/or to add system features). An example of the former type of normalization is for all credentials to be converted to lower-case representations before they are salted and hashed. As an example of a feature extending type of normalization, one may sort the words of the fastwords in order to obtain order invariance.

As will be described in more detail below, in various embodiments, different types of information can be stored at 406. For example, in addition to or instead of storing all three words as a 3-gram, various 2-grams (e.g., "work frog" "frog flat" "flat work") might be stored at 406. As another example, equivalence classes may be defined so that minor deviations from the selected fastword will also be considered acceptable credentials if presented by Bob at a subsequent point (e.g., "work frog flattened"). Additional detail pertaining to equivalence classes is provided below. Also, as will be described in more detail below, the fastword need not be made of exactly three words.

Figure 5:
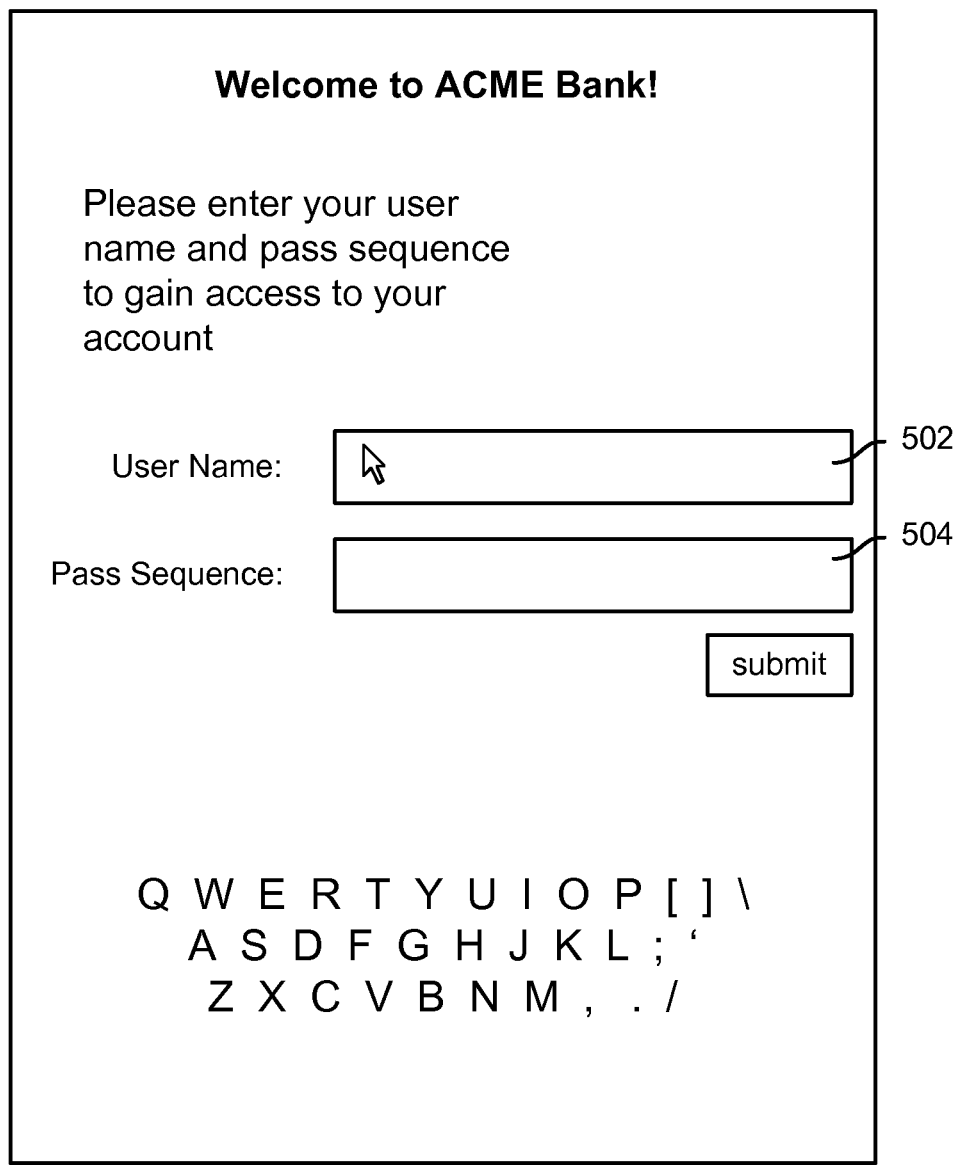
FIG. 5 illustrates an embodiment of an interface.

FIG. 5 illustrates an embodiment of an interface. In the example shown, Bob has successfully registered for an online account with ACME Bank, and would like to use his account to review the balance of his checking and savings accounts via mobile phone 106. Bob directs the browser of his phone to website 114 and is presented with interface 500 after selecting a "login here" link provided by the website. As with the registration interface, interface 500 prompts Bob to enter a user name in region 502 and a pass sequence in region 504.

Figure 6:
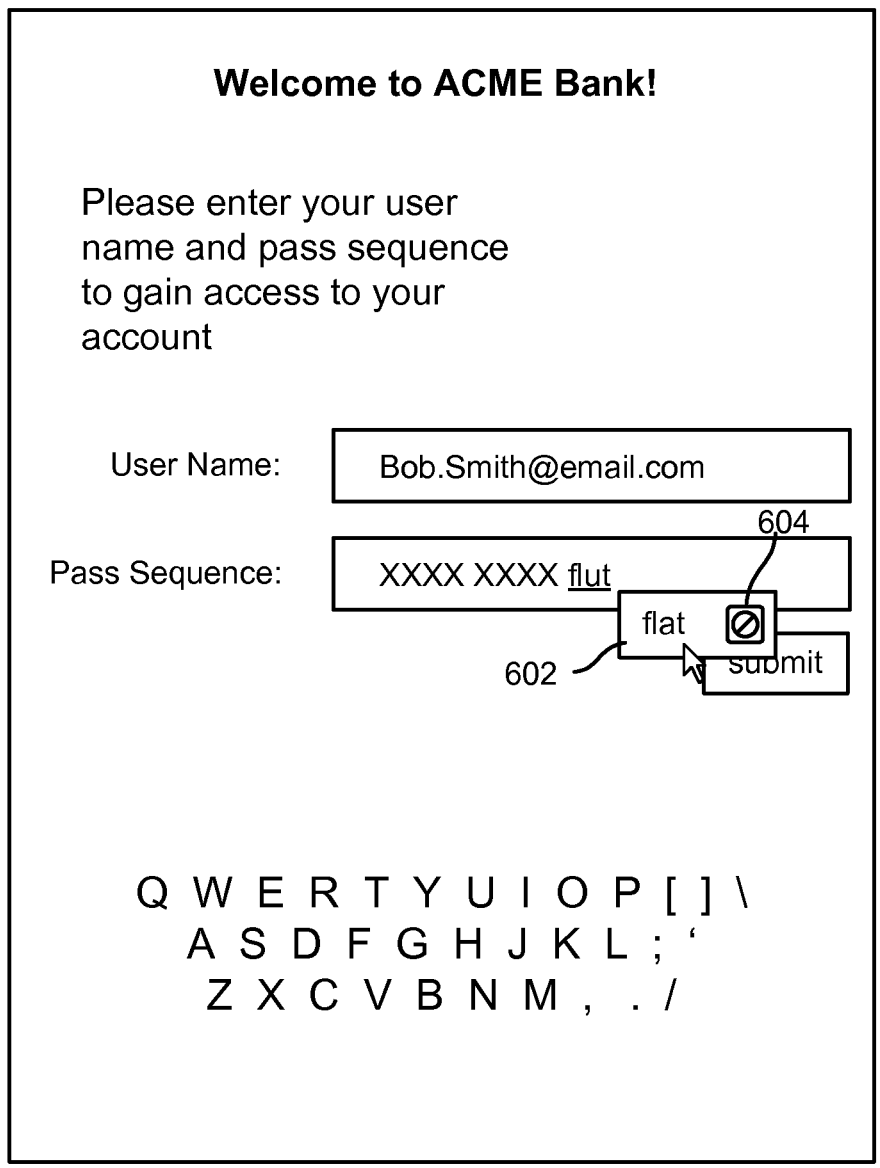
FIG. 6 illustrates an embodiment of an interface.

FIG. 6 illustrates an embodiment of an interface. In the example shown, Bob has provided his user name in interface 500 and is in the process of entering his pass sequence. As he completes each word (e.g., selecting the space key), the letters of the word are replaced with the "X" symbol. One way this can be achieved is through use of JavaScript or an embedded program such as a Flash or Java applet. JavaScript (or any other appropriate technology) can also be used to track the number of characters typed by the user in conjunction with entering the fastword. This can be used to detect whether a user is pasting in credential information and/or has auto completion settings that are not desirable from a security standpoint. For example, if all Bob needs to do to enter his fastword is type the letter, "F," that is considerably less secure than typing, e.g., 25% or 50% of the total characters.

As shown in FIG. 6, Bob has just mistyped the last word of his fastword. Instead of "flat," he has entered "flut." Bob is presented with an auto-correct suggestion in region 602. If Bob clicks on "flat," in region 602, his fastword will be auto-corrected from "work frog flut" to "work frog flat." Bob could also select the "cancel" symbol 604. In various embodiments, auto-correct suggestions are automatically selected for the user, without requiring the user to confirm the auto-correction action.

Figure 7:
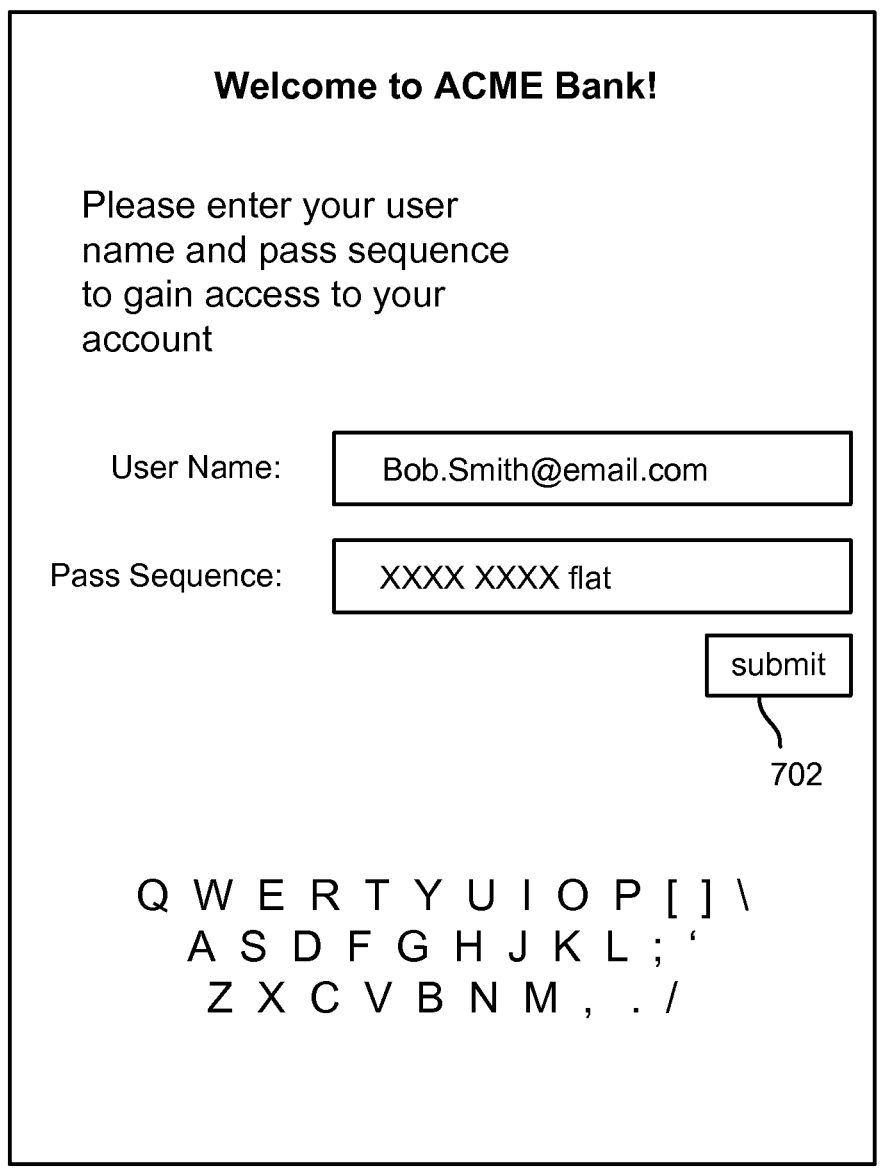
FIG. 7 illustrates an embodiment of an interface.

FIG. 7 illustrates an embodiment of an interface. The example shown illustrates interface 600 after Bob has elected to auto-correct "flut" to "flat." Note that in this example, the auto-correction feature is not correcting what is typed to make it more similar to the stored credential. It is correcting words to make them valid words in the language (or languages) it is currently using. Therefore, it is not proposing what the credential is, but only helping the user avoid misspellings. Similarly, the auto-completion suggests likely words when sufficient parts have been entered to make the choice near-predictable or predictable. As will be explained in more detail below, by requiring each constituent word in a fastword to be present in a dictionary (e.g., the phone's auto-correct dictionary, a dictionary associated with a web browser, and/or a dictionary stored by a server such as server 116), Bob is able to quickly and efficiently enter a secure credential on an input constrained device. When Bob selects submit button 702, the credential is transmitted over an encrypted channel to server 116, which will confirm that the credential supplied by Bob is valid and will allow Bob to access banking resources.

Figure 8:
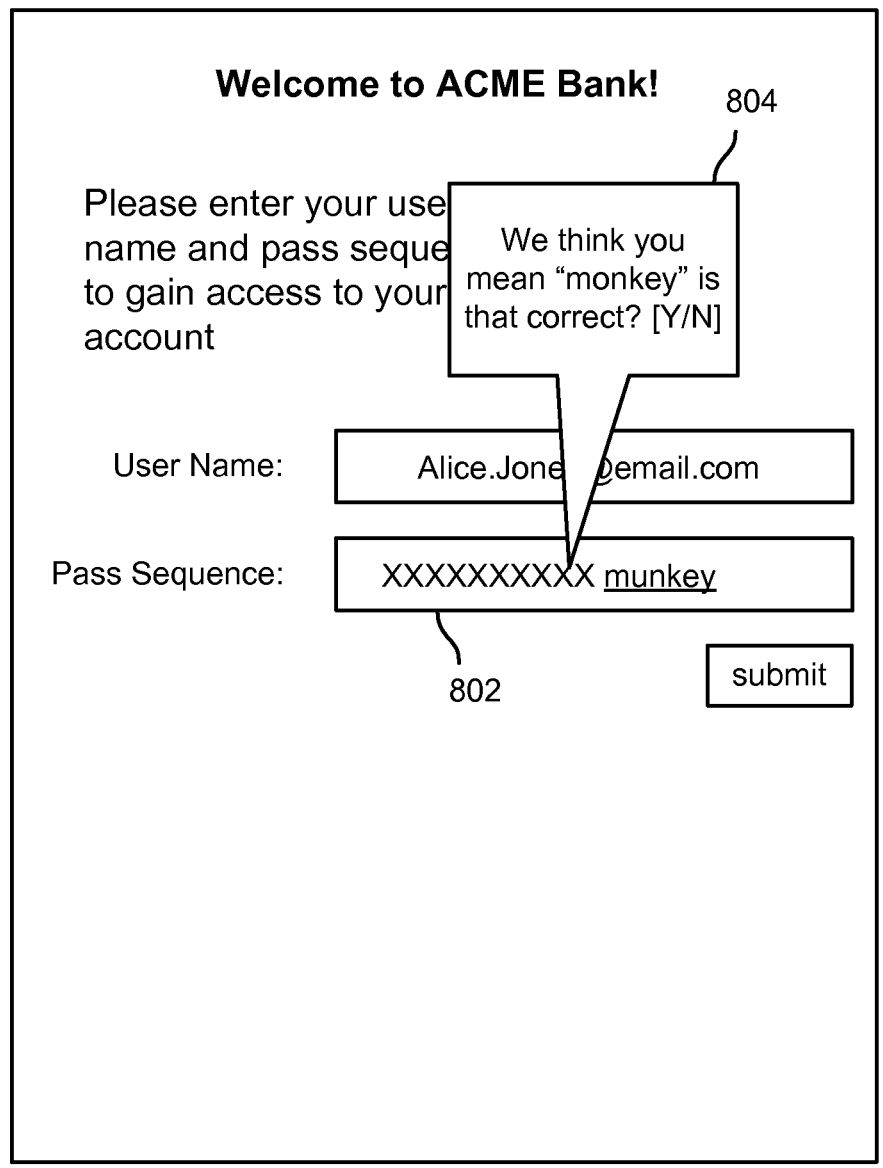
FIG. 8 illustrates an embodiment of an interface.

FIG. 8 illustrates an embodiment of an interface. As previously explained, Alice uses both laptop 104 and mobile phone 102 to access ACME Bank's online services. After completing the enrollment process (e.g., in accordance with the process illustrated in FIG. 4, via either her laptop or her phone), Alice can benefit from the use of the techniques described herein when using either of those devices. For example, illustrated in FIG. 8 is ACME Bank's login page as rendered in a browser application installed on Alice's laptop 104. Alice's browser includes both an auto-correct feature and an auto-complete feature both of which assist her when entering input into forms. Suppose Alice's fastword is "aggressive monkey milk book." In the example shown, Alice is in the process of entering her fastword in region 802. Suppose Alice has correctly typed the first word, "aggressive." In various embodiments, the typing of a longer word, such as "aggressive" is made faster through the use of an auto-complete feature. As will be explained in more detail below, fuzzy matching can be employed, allowing Alice to leverage any appropriate auto-complete suggestion (e.g., "aggression" and "aggressor") without requiring the precise form (i.e., tense, conjugation, or part of speech) of the word, "aggressive." As explained above, the number of keystrokes required by Alice to enter a word (e.g., a total of 4 prior to auto-completing "aggressive,") can also be monitored for. If an insufficient number of keystrokes occurs, a suggestion can be made to Alice that she change her credential or she can be forced to change her credential, as applicable.

Alice has mistyped "monkey" as "munkey." As indicated in region 804, Alice's browser has made an auto-correct suggestion accordingly. In various embodiments, auto-correct functionality is provided by server 116, e.g., via a programming language that can run in the browser such as JavaScript. The auto-correct functionality can depend on the language used and the keyboard that is connected or used. Different keyboards have different layouts, and these result in different types of common errors. The keyboard type can be user selected at the time of setup, inferred from typos, assumed or inferred from the device type.

When accessing ACME Bank's services via the application installed on her mobile device, Alice will be presented with an interface similar to the one shown in FIG. 5, however, as Alice's phone includes a keypad, the on-screen keyboard will be omitted in some embodiments. When entering her fastword, auto-correction functionality can be provided natively by her phone, by server 116 (e.g., via JavaScript), or by the banking application installed on her phone.

FIG. 9 is a flow chart illustrating an embodiment of an authentication process. In various embodiments, the process shown in FIG. 9 is performed by a system such as server 116. The process shown in FIG. 9 can also be performed by other entities, such by being performed on device 106 by the screen unlock and/or journal applications or by being performed on device 108. The process begins at 902 when a plurality of words is received. As one example, words are received at 902 when Bob clicks on submit button 702. As with the enrollment process shown in FIG. 4, the plurality of words may be received at the same time and may also be received one at a time, as applicable. At 904, the plurality of words is parsed. Finally, at 906, an authentication is made by determining a match based on information associated with at least one of the received words in the plurality. As one example, at 906 server 116 looks up the appropriate user record (given the user name or other identifier) and salts and hashes the normalized credential to be verified, comparing the result with the stored result. More specifically, the value "salt" is extracted from the database, and hash(W, salt) is computed, where W is the normalized credential to be verified. If the result of the hash matches the stored result, the authentication is said to succeed. Additional detail on techniques for performing the processing at 906 is provided below.

Figure 10:
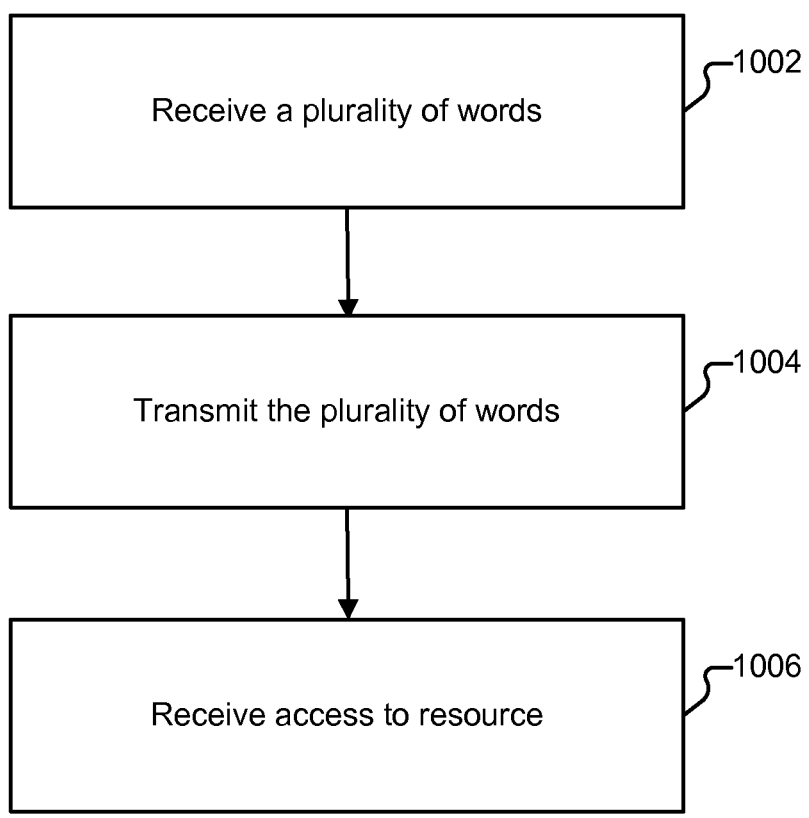
FIG. 10 is a flow chart illustrating an embodiment of an authentication process.

FIG. 10 is a flow chart illustrating an embodiment of an authentication process. In various embodiments, the process shown in FIG. 10 is performed by a device such as any of devices 102-110. The process begins at 1002 when a plurality of words is received. As one example, words are received at 1002 when Bob enters them into device 106 via on-screen keyboard 206. At 1004, the plurality of words is transmitted. As one example, the processing of 1004 is performed when Bob clicks on submit button 702. The process concludes at 1006 when, if the authentication is successful, access to a resource is granted. For example, when Bob clicks submit button 702, based on the fastword illustrated in FIG. 7, Bob will be granted access to banking resources at 1006.

Figure 11:
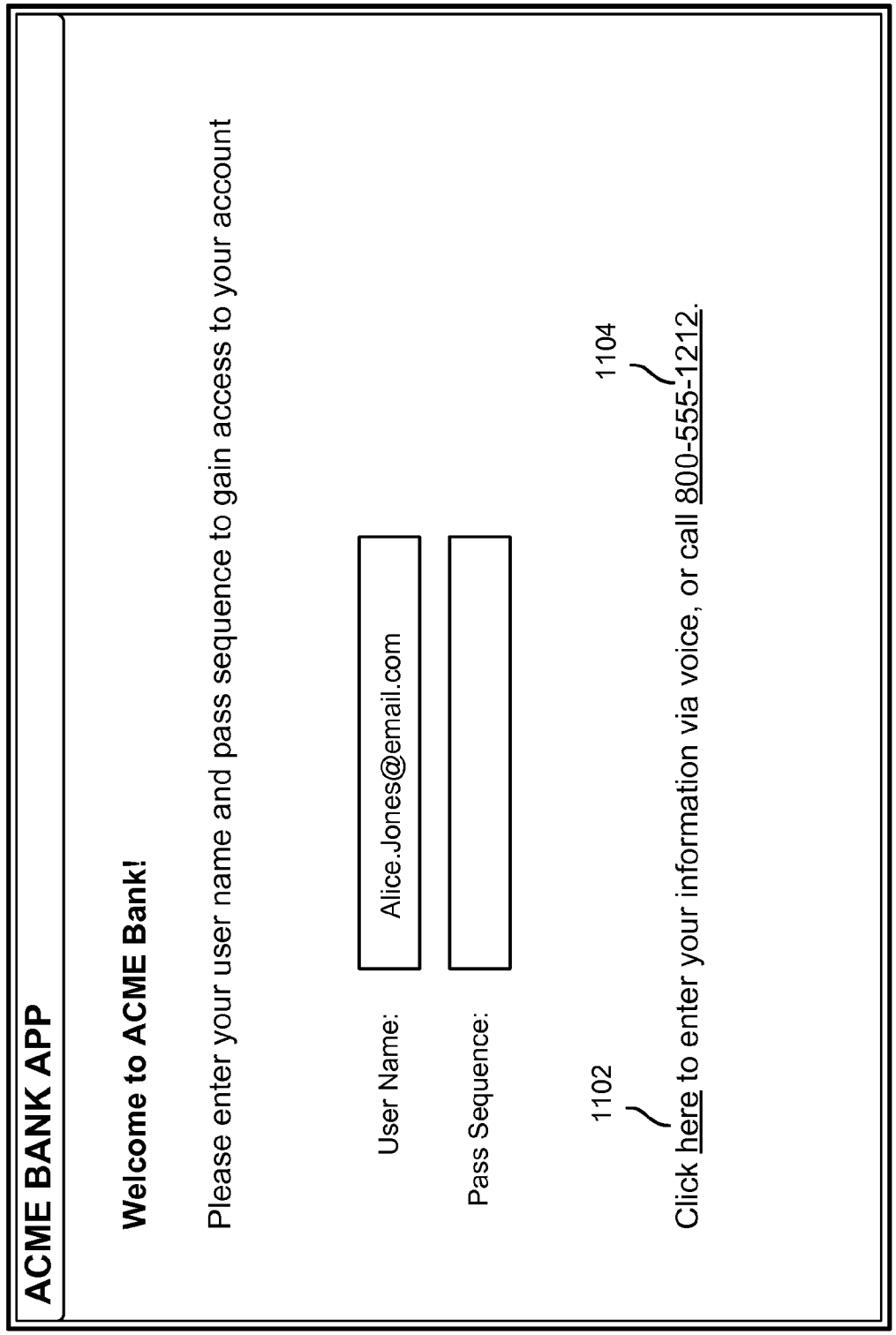
FIG. 11 illustrates an embodiment of an interface.

FIG. 11 illustrates an embodiment of an interface. In the example shown, Alice is attempting to access ACME Bank's services via the application installed on her mobile device 102. In addition to providing credential information by typing (e.g., on the keypad of the phone), Alice is also able to enter her information by speaking it (e.g., into the phone's microphone or attached/paired headset). Alice can provide the aural version of her information by clicking on link 1102 (which will result in the launching of an audio capture function) and can also provide the aural version of her information by calling the provided phone number (1104) and interacting with the IVR interface mentioned previously. Additional detail on the processing of a spoken credential is provided below. In the example shown, Alice's user name is pre-filled from prior use of the application. In various embodiments, Alice is also able to speak her user name and/or may engage in a combination of entry techniques (e.g., by entering her name on the keypad and speaking her fastword into the microphone). As mentioned previously, Alice can also interact with server 116 via telephone 110. For example, Alice is able to speak the words, "aggressive monkey milk book" into telephone 110 to retrieve bank account balance information via ACME Bank's IVR interface.

Figure 12:
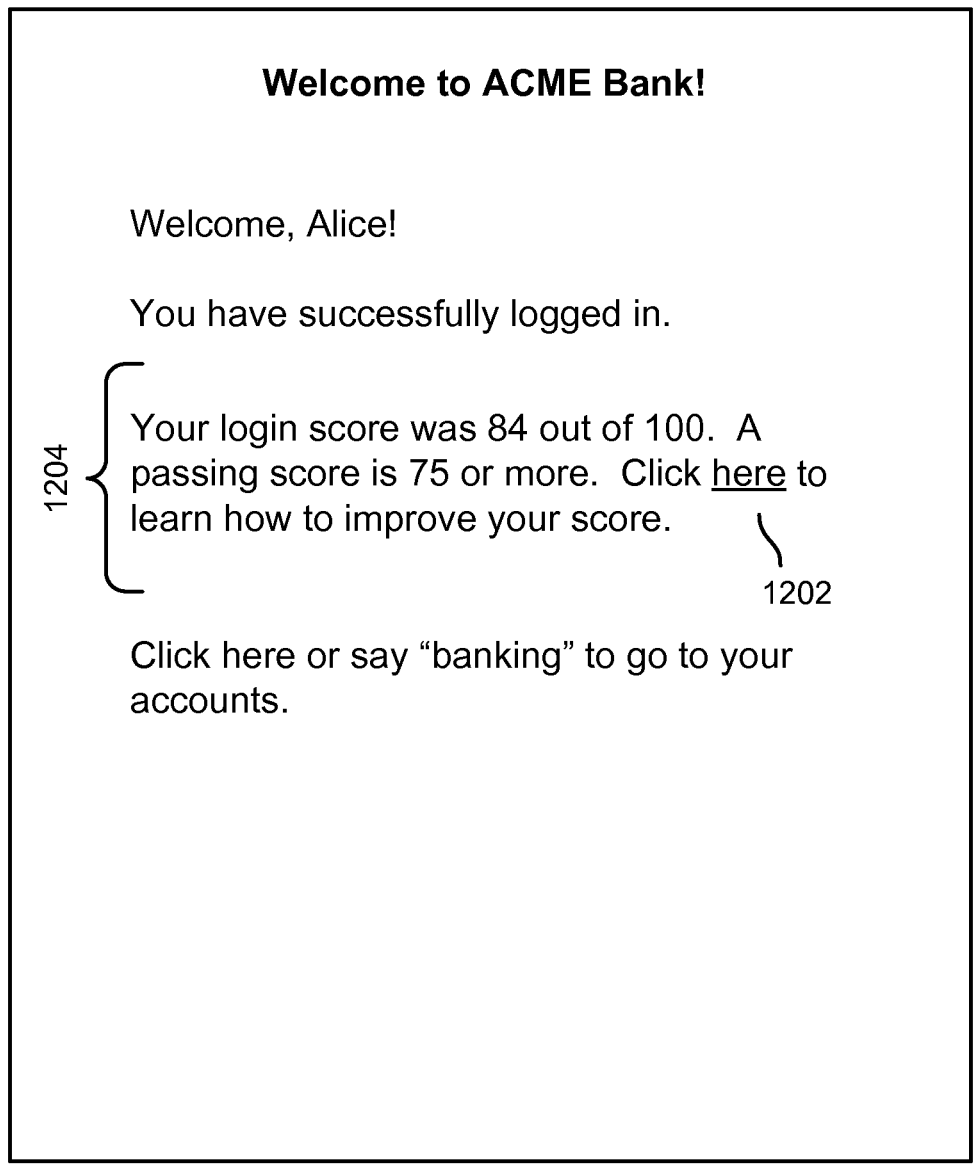
FIG. 12 illustrates an embodiment of an interface

FIG. 12 illustrates an embodiment of an interface. In the example shown, Alice is presented with interface 1200 immediately after successfully entering her fastword by speaking it into her phone's microphone. As shown, interface 1200 includes an indicator of how well her login attempt went (i.e., in region 1204). If she clicks on link 1202, she will be presented with advice for how to improve the score. Examples of such advice may include suggesting that she speak slower, avoid background noise, enter words more cautiously (e.g., in the case of key-based entry), replace or update the pass sequence, and/or any other appropriate advice that will help her authenticate herself better the next time.

FIG. 13 illustrates an embodiment of an interface. In the example shown, Bob is viewing the screen of his phone as locked by a locking application installed thereon. Interface 1300 includes several randomly selected words in addition to the first word of Bob's fastword ("frog"). In order to unlock his phone, Bob selects region 1302. In various embodiments, a tolerance is employed so that Bob need not precisely select the exact center of the word, but instead need only select an area of the screen where most of the word or a portion of the word is present (or sufficiently near). Similar techniques can be used in conjunction with other interfaces, such as video game controllers and eye-tracking cameras, where it may be more convenient for a user to select a region in which the word is found, rather than focus precisely on the word itself.

In some embodiments all three of the "keywords" that make up Bob's fastword are displayed in interface 1300. In other embodiments, upon selecting "frog," the random words depicted on the screen are replaced and the second keyword in Bob's fastword ("work") is presented among them. As shown in FIG. 13, the various words from which Bob can select the constituent parts of his fastword appear scattered, in a random order. One benefit of randomly positioning the pool of words is that smudges which might otherwise develop from the regular unlocking of a device (e.g. employing a conventional touch-screen unlock scheme) cannot be used to guess at Bob's fastword. In various embodiments, sorting is applied, for example, the pool of words could be alphabetized, ordered by length, or otherwise deliberately arranged.

FIG. 14 illustrates an embodiment of an interface. In the example shown, Bob is viewing the screen of his phone as locked by a locking application installed thereon. Interface 1400 includes several randomly selected words in addition to a permutation of the second word of Bob's fastword ("work" appears as "working" 1402). In various embodiments, Bob is asked to select the constituent words of his fastword in their correct order (i.e., "frog work flat,"), is asked to select the constituent words of his fastword out of order (e.g., where "flat" might be shown before "frog,"), is asked to select synonyms for the constituent words (e.g., where "work" might be shown as "job"), or any other appropriate way of demonstrating knowledge of the fastword.

Figure 15:
FIG. 15 illustrates an embodiment of an interface.

FIG. 15 illustrates an embodiment of an interface. In the example shown, Bob is attempting to access his diary via a diary application installed on his phone. In some embodiments, (e.g., where multiple applications that use fastwords are present on a device), the device may limit the ability of the user to re-use the same fastword with the same application. For example, the operating system on Bob's phone may disallow him from using "frog work flat" to both unlock his phone and to access his diary. In addition, a given application may allow (or require) that multiple fastwords be enrolled. Suppose one of Bob's alternate fastwords is "goat bucket upside sticker new broom." Instead of requesting that Bob enter all of the words of that fastword, the journal application has provided half of the fastwords on the screen and prompted Bob to enter the missing portions.

Additional details on aspects of various embodiments will now be provided.

Deciding on Minimum Requirements

NIST estimates that the distribution of conventional passwords corresponds to an entropy of 4 bits for the first character, 2 bits for the next 7 characters, 1.5 bits per character for the 9th to the 20th characters, and 1 bit for the remainder of the password. Six bits of entropy is added when the user is forced to use both upper case and non-alphabetic characters in a conventional password. These NIST estimates are for passwords typically entered on a full-sized computer keyboard—conventional mobile passwords are likely to have a lower entropy due to the complications of entering them.

One measure of how likely it would be to guess a fastword sequence is to determine the product of the frequencies with which each of the constituent words appears in common English (or, in the event an alternate language is used, the appropriate language). According to the Microsoft Web N-Gram Service, the respective frequencies of the three keywords in regular English are: for "frog," $2^{-17.0}$, for "work," $2^{-10.6}$, and for "flat," $2^{-14.5}$. The product of these frequencies is $2^{-42.3}$. This score corresponds to more than twice the bit strength of common passwords Another measure of how likely it would be to guess a fastword sequence is to consider the frequency of the n-gram as a whole. For example, suppose Bob initially attempted to enroll using the fastword "I love you honey." The product of frequencies here is $2^{-43.7}$ (computed from $2^{-7.8}$, $2^{-11.8}$, $2^{-7.8}$, and $2^{-16.3}$) which appears to suggest a stronger credential than our first example. However, the fact that the sequence is a grammatically correct sentence—and a common one—makes it more likely to occur, and therefore weaker as a credential. In this example, the frequency of the 4-gram (all four words together) is only $2^{-25.8}$. The 3-gram frequency of "frog work flat," in contrast, is $2^{-49.5}$. Accordingly, in some embodiments the enrollment process requires that the n-gram frequency of a candidate fastword be lower than the product of individual frequencies.

In some embodiments the keywords that may be selected cannot include names (e.g., first names, last names, celebrity names, place names). Users may otherwise be tempted to select names of friends and family members, or favorite people/places—which are often possible to gather from social networks and other publicly accessible sites. Many names are not found in dictionaries; those that are can be excluded in an automated manner. For example, the Webster dictionary labels names as "biographical name," which means such names can be summarily excluded from use in a fastword. Using the techniques described herein, the precise requirements of a fastword can be articulated to users and enforced because the constituent parts of a fastword can be parsed on a component level. Any fastword that is considered insufficiently strong will be refused; the user can either simply be told to enter a new one, or be told of the rule that caused the fastword to be rejected.

Credential Strength Checking

As explained above, it is possible to measure the strength of a fastword by analyzing the frequencies of the constituent keywords and/or the entire n-gram (e.g., as determined through use of the Microsoft Web N-Gram Service). However, the word frequencies can be relative to any preferred corpus, such as standard spoken English (or other language, where applicable), Tweets, words used on Facebook, already registered credentials, or any combination of sources. In the case of different languages, the user can either be asked from which language(s) the words in the fastword will be selects or can be inferred based on the words used.

As a new credential is submitted, whether as an account is set up or to replace/supplement an existing credential, a credential strength checker (e.g., 118) is used to verify that the credential is sufficiently strong. The credential strength checker will determine the product of single-word frequencies of the words in a credential and also determine the n-gram frequency of the sequence. The frequency product is a good strength estimate if the words in the sequence are largely independent, while the n-gram frequency is a better estimate if the words exhibit dependencies. In some embodiments, the maximum of these measures is the strength measure, which estimates the probability of success for an exhaustive search attack.

In some embodiments the output of the credential strength checker is the inverse of the maximum of the result of the different checks, which is the estimated probability with which the adversary is expected to be able to guess the credential. Alternatively, it can be represented as the minimum of the bits of security of the two tests, i.e., the negative second logarithm of the associated frequency. In contrast to typical passwords, it is not desirable for the user to include non-dictionary words in a fastword. This is because the auto-completion feature on the client device would learn these new terms eventually—which inevitably means to store them. This is undesirable from a security stance. To avoid this, server 116 will verify that all words are dictionary words (i.e., included in dictionary 120) when the user registers a fastword.

Equivalence Classes

The use of equivalence classes—such as normalizing different tenses of verbs—permits the adaptation of the authentication mechanism to how people remember and enter credentials. Further, using the techniques described herein, a determination can be made (e.g., on server 116) of the degree of correctness of a given login attempt, in contrast to what can be done in traditional password systems. One way to achieve fuzziness is through an expansion of the records used to store salted and hashed credentials.

Conceptual Equivalence Classes

In some embodiments conceptual equivalence classes are used to allow for variants of a word to be accepted. The use of conceptual equivalence classes addresses a situation in which some words are largely interchangeable to users, a situation which could otherwise potentially create difficulties if a user has to remember the exact keywords he used. As a simple example, an equivalence class may contain different tenses of a given verb—in order, for example, to avoid a distinction to be made between the word "run" and the word "running". Equivalence classes may also be used to allow substitution of words of similar meaning. For example, a user entering a fastword (mother, stroke, wedding) during enrollment may later attempt to authenticate using the sequence (mom, stroke, wedding) or (mother, rub, wedding)—depending on whether the person uses multiple terms to refer to his/her mother and the meaning of "stroke".

Given a credential $W=(w1, w2, \ldots wk)$, the backend would compute the equivalence classes $E(W)=(E(w1), E(w2), \ldots E(wk))$, where E is the function that maps a word to its equivalence class. Instead of computing hash(W, salt) for a given value salt, the backend would compute hash(E(W), salt)—whether for the purposes of enrollment or authentication.

Homophonic Equivalence Classes

In various embodiments, a normalization corresponding to homophonic equivalence classes is used to simplify voice-based entry of credentials. Standard dictation tools can be used to create a mapping from the audio sample to a homophonic equivalence class; this corresponds to the error-correction processing of text inputs. To avoid having to train the tool on individual speakers, in some embodiments wide equivalence classes are used in which a large number of words are mapped to the same equivalence class, which will result in the same selection of equivalence class for different pronunciations and accents. The resulting equivalence classes are phonetic representations of the words on the fastword. To process the credential, server 116 backend would salt and hash the sequence of phonetic representations to create the credential record. In some embodiments, such as where spoken authentication is only used on a single device (e.g., in conjunction with Bob's screen unlock application), training on an individual (e.g., Bob) may be employed.

The creation of homophonic equivalence classes, and the associated credential records, can be done in addition to the other credential records created and maintained by server 116 and/or can be omitted, requiring the spoken fastword to be clearly dictated. During voice-based authentication, the candidate credential would be verified by being represented by its phonetic description, salted, hashed, and compared to the stored record.

Fuzzy Authentication

In some embodiments, instead of storing a salted hash of the full credential W during the enrollment process, the backend server stores salted hashes of all acceptable variants. This is done in a manner that does not reveal the number of words k of the credential. Assuming that there are no more than k=6 words in the credential, then there are no more than six subsets of the credential in which one word has been omitted—and one verbatim credential. Server 116 then would select seven independent salt values and compute a hash of each valid credential after salting it. If, in this setting, k>6 (i.e., the credential has more than six words), only six of the subsets would be deemed acceptable; if there are fewer than six subsets, then the full credential would be salted/hashed enough times to make up k+1 salted hashes. This way, one cannot infer the value k from a user record on the backend. The order of the stored credentials is deterministic, e.g., first the full credential, followed by credentials in which the first, second, etc., word is omitted before the salted hash is computed.

One way to perform fuzzy verification of a submitted credential during an attempted login is to check it against each of the stored credentials. This is done by computing the hash of the concatenation of the submitted credential concatenated with each of the stored salt values and comparing the results with the stored salted hashes. If the submitted credential, after being salted and hashed, matches the stored full credentials, then the login attempt is successful. If either of the comparisons with the stored subset-credentials results in equality, then the submitted credential is known to be almost correct. Fuzzy authentication can be used to permit both the addition of one (or a few) additional words (e.g., "car frog work flat") and the omission of one (or a few) words (e.g., "frog flat"). In the case of the former, each of the four words could respectively be removed prior to performing a match. When "car" is removed, a verbatim match would be achieved and could be treated as either a complete match or a fuzzy match based on policy.

During authentication, the server 116 would accept any credential that is a verbatim match. Policy rules can be defined for how to react to "almost correct" credentials. For example, the backend server may consider an "almost correct" attempt as a successful login attempt; may permit limited access; or may not count it as a likely adversarial attempt to access the account. In the last case, the submitter may be permitted to continue to try to enter the credential without penalty. In contrast, other failed login attempts would be counted, and the account temporarily locked down after a certain number of these.

Fuzzy Blacklists

If a given user's credentials are believed or known to have been compromised (e.g., by a phisher or malware), then the exposed credential can be placed on a user-specific blacklist (e.g., stored in database 122). This would block the user from using this credential—or one with a large overlap—later on. In various embodiments, the user-specific blacklist is augmented with information associated with the user, such as the user's screen name, street address, names of pets, names of hobbies, etc., all of which could potentially exist in dictionary 120 but be undesirable for the user to include in a fastword for security reasons. The information can be gleaned from information provided to server 116 (e.g., in conjunction with registration) and can also be scraped from social networking sites or other sites that include profile information, as applicable.

Enhanced Estimates of Credential Strength

As explained above, measures of the strength of a fastword include whether the individual words are sufficiently uncommon and the combination of words is, too. One assumption included there is that users select words for fastwords according to the frequencies of words in natural language. However, users are likely to prefer shorter words to longer words. This preference can be compensated for by weighing shorter words more when computing a weighted product of frequencies (instead of a product of frequencies) and a weighted n-gram frequency (instead of just the n-gram frequency). By monitoring the actual word frequencies in fastwords (as opposed relying only on frequency databases for spoken or written language), server 116 can also gradually improve its estimates.

Security depends on the number of and sizes of the equivalence classes. For simplicity, assume that all words belong to homophonic equivalence classes and that each such class contains exactly s elements. The probability of being able to guess the sequence will be increased by a factor of $s^n$ where n is a number of words in a sequence. For n=3 words in a sequence and for equivalence classes of size s=8 words, this means a reduction of security by a factor $2^{15}$. In other words, a fastword whose probability of being guessed is $2^{-42}$ would be guessable with a rough probability of $2^{-27}$ if equivalence classes are used. Comparing this to typical password security, the result is still much more secure.

Similarly, if the system accepts a login attempt with only a partial match to the registered fastword, this affects security. It is possible to set a threshold for the minimum security required. For example, if one subset of keywords correspond to a sufficiently low frequency measure, while another does not, then the first would be accepted but the second would not (at least not without any additional support for the login attempt). Examples of such support include an attempt being made from a known IP address, the presentation of correct keyboard or other biometric information, and the presence of the device within an expected locale (e.g., as determined via GPS or cellular tower identifications). It is also possible that an authentication above one level gives access to certain resources, whereas an authentication above another level gives access to others.

Example Mnemonics and Scores

Below are several examples of mnemonic stories that users could rely on to remember their fastwords. For each story, the three keywords (e.g., provided by the user) that make up the fastword for that story are underlined, and the respective singleword frequencies are provided in parentheses. Each story starts with a label that is the 3-gram frequency of the fastword and the maximum of the 3-gram frequency and the product of the single-word frequency.

($2^{-53.0}$, $2^{-48.8}$) "Back in February I lost my job due to the company downsizing ($2^{-20.1}$) I was worried ($2^{-16.7}$) about how to pay my bills but managed to find a better ($2^{-12.1}$) job in 3 days."

($2^{-55.2}$, $2^{-43.2}$) "My mother ($2^{-13.8}$) had a stroke ($2^{-15.7}$) one week before my wedding ($2^{-13.7}$)."

($2^{-61.6}$, $2^{-53.4}$) "Up until recently, I always thought penguins ($2^{-17.5}$) were the size of humans ($2^{-15.9}$). I'm in my twenties ($2^{-20.1}$)."

($2^{-46.9}$, $2^{-42.8}$) "When I was about six ($2^{-13.3}$) years old, I took part in a dancing competition. One of my bangles ($2^{-20.0}$) broke while dancing and so I started to search ($2^{-9.6}$) for it."

($2^{-43.5}$, $2^{-43.5}$) "I left my house one day to find my bicycle ($2^{-16.4}$) had been stolen ($2^{-16.5}$). Later, I saw it outside the convenience store, so I waited there for the thief. That's how I met my wife ($2^{-14.3}$)!"

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a set of one or more interfaces configured to receive, from a device operated by a user, input provided by the user comprising:
        a user identifier;
        and a credential comprising a plurality of separately parseable words;
    a set of one or more processors configured to:
        parse the credential into a set of constituent words;
        perform one or more of the following checks on the set of constituent words:
            that each of the constituent words in the set is present in a dictionary;
            that none of the constituent words in the set is a proper noun;
            that none of the constituent words in the set is present in a blacklist;

that the credential includes at least a threshold number of constituent words;
that each individual word in the set is of at least a first threshold length;
that the set of constituent words are collectively of at least a second threshold length;
that the set of constituent words have at least a threshold entropy; and
that a measure of strength determined for the set of constituent words meets a minimum threshold;
in response to determining that the set of constituent words satisfy the one or more checks, generate at least one of:
a normalized credential at least in part by normalizing one or more of the set of constituent words, wherein normalizing comprises mapping the one or more constituent words to one or more equivalence classes, and wherein equivalence classes are defined such that deviations from constituent words will also be considered acceptable in the event that the deviations are provided by the user in a subsequent authentication process; and
a set of acceptable variants of the normalized credential that will also be considered acceptable in the event that an acceptable variant in the set of acceptable variants is provided by the user in a subsequent authentication process, wherein generating the set of acceptable variants comprises determining a plurality of different combinations of subsets of the constituent words of the normalized credential; and
store, in a credential set associated with the user identifier, a set of representations corresponding to at least some of the normalized credential and the set acceptable variants as stored enrolled credentials; and
a memory coupled to the set of one or more processors and configured to provide the set of one or more processors with instructions.

2. The system of claim 1, wherein each combination omits a different one of the constituent words.

3. The system of claim 1, wherein determining a measure of strength for the constituent words comprises performing at least one of a word frequency analysis and an n-gram frequency analysis.

4. The system of claim 1, wherein the set of one more processors is further configured to cause to be displayed a credential quality indicator based on the performed one or more checks, including a score, a color indicator, or specific feedback for the user for improving the credential.

5. The system of claim 1, wherein a deviation comprises a deviation from a particular form of a constituent word, including a tense, conjugation, or part of speech.

6. The system of claim 1, wherein:
the one or more equivalence classes comprises one or more conceptual equivalence classes; and
a deviation comprises substituting a word having a meaning similar to the constituent word.

7. The system of claim 1, wherein normalizing one or more of the constituent words further comprises one or more of:
converting the constituent words to lower-case; and
sorting the constituent words.

8. The system of claim 1, wherein generating the set of acceptable variants of the normalized credential further comprises confirming that a measure of strength determined for each of the plurality of combinations of subsets of the constituent words also meets the minimum threshold.

9. The system of claim 1, wherein an order of the stored enrolled credentials of the credential set is deterministic, such that a representation corresponding to the normalized credential appears first, followed by representations corresponding to each acceptable variant in the set of acceptable variants of the normalized credential.

10. The system of claim 1, wherein:
the set of representations corresponding to at least some of the normalized credential and the set of acceptable variants of the normalized credential are generated by performing a salted cryptographic hash function on at least some of the normalized credential and the set of acceptable variants of the normalized credential; and
a set of resulting hash values are stored in the credential set associated with the user identifier as the set of representations, along with a set of corresponding random salt values.

11. A system, comprising:
a set of one or more interfaces configured to receive, from a device operated by a user, input provided by the user comprising:
a user identifier; and
a credential comprising a plurality of separately parseable words;
a set of one or more processors configured to:
parse the credential into a set of constituent words;
access a credential set associated with the user identifier, stored during a previous enrollment process, comprising a set of representations corresponding to a set of stored enrolled credentials including at least some of a normalized credential and a set of acceptable variants of the normalized credential, wherein the set of acceptable variants comprise different combinations of subsets of the constituent words in the normalized credential; and
authenticate the received credential by performing a match, wherein performing the match comprises:
normalizing one or more of the set of constituent words to generate a normalized received credential to be verified, wherein normalizing comprises mapping the one or more constituent words to one or more equivalence classes, and wherein equivalence classes are defined such that deviations from constituent words previously provided by the user during the previous enrollment process will also be considered acceptable;
comparing one or more representations corresponding to the normalized received credential to be verified to the set of representations corresponding to the set of stored enrolled credentials;
determining whether one of the one or more representations corresponding to the normalized received credential to be verified matches one of the set of representations corresponding to the set of stored enrolled credentials based on information associated with the constituent words; and
grant the user access to a resource in the event that the match is determined to be successful; and
a memory coupled to the set of one or more processors and configured to provide the set of one or more processors with instructions.

12. The system of claim 11, wherein each combination omits a different one of the constituent words.

13. The system of claim 11, wherein:
one or more of an auto-correct function and an auto-complete function is active on the user device during input of the credential;
the auto-correct function suggests valid words in order to avoid misspellings; and the auto-complete function suggests likely words when sufficient parts have been input to make a predictable or near-predictable choice.

14. The system of claim 13, wherein:
receiving input provided by the user further comprises tracking a number of characters typed by the user in conjunction with entering the credential; and
authenticating the credential further comprises:
determining a number of key strokes required to input at least one of the constituent words; and
determining whether the user is pasting in the credential or whether the user device has undesirable auto-completion settings.

15. The system of claim 11, wherein:
the input provided by the user is spoken;
parsing the credential comprises mapping at least a portion of the spoken input to a constituent word;
the one or more equivalence classes comprises one or more homophonic equivalence classes; and
the one or more representations of the normalized credential to be verified comprise phonetic descriptions of the constituent words.

16. The system of claim 11, wherein a deviation comprises a deviation from a particular form of a constituent word, including a tense, conjugation, or part of speech.

17. The system of claim 11, wherein:
the one or more equivalence classes comprises one or more conceptual equivalence classes; and
a deviation comprises substituting a word having a meaning similar to a constituent word.

18. The system of claim 11, wherein normalizing one or more of the constituent words further comprises one or more of:
converting all of the constituent words to lower-case; and
sorting the constituent words.

19. The system of claim 11, wherein two constituent words are considered to match in the event that the two constituent words are related according to a metric or the two constituent words are both present in an equivalence class.

20. The system of claim 11, wherein:
a number of words included in the credential provided by the user during the authentication process is greater than a number of words included in the credential previously provided by the user during the enrollment process; and
performing a match further comprises:
removing a different one of the constituent words prior to comparing the representations; and
determining that a match exists for all but one of the constituent words.

21. The system of claim 11, wherein authenticating the credential further comprises displaying a success score indicator and suggestions for improving the success score in a subsequent authentication process, including suggesting that the user speak slower or avoid background noise in the event that the input provided by the user was spoken, suggesting that the user enter words more cautiously in the event that the input provided by the user was typed, or suggesting that the user replace or update the credential.

22. The system of claim 11, wherein:
the one or more representations corresponding to the normalized received credential to be verified are generated by performing one or more salted cryptographic hash functions on the normalized credential to be verified, wherein one or more random salt values, stored along with one or more corresponding hash values as the set of representations of the set of stored enrolled credentials, are extracted from the credential set; and
performing a match further comprises:
comparing one or more resulting hash values to the one or more hash values stored in the credential set; and
determining whether one of the one or more resulting hash values matches one of the stored hash values.

23. A method, comprising:
receiving, from a device operated by a user, input provided by the user comprising:
a user identifier;
and a credential comprising a plurality of separately parseable words;
parsing the credential into a set of constituent words;
performing one or more of the following checks on the set of constituent words:
that each of the constituent words in the set is present in a dictionary,
that none of the constituent words in the set is a proper noun;
that none of the constituent words in the set is present in a blacklist;
that the credential includes at least a threshold number of constituent words;
that each individual word in the set meets is of a first threshold length;
that the set of constituent words are collectively of a second threshold length;
that the set of constituent words have at least a threshold entropy; and
that a measure of strength determined for the constituent words meets a minimum threshold;
in response to determining that the set of constituent words satisfy the one or more checks, generating, using a set of one or more processors, at least one of:
a normalized credential at least in part by normalizing one or more of the set of constituent words, wherein normalizing comprises mapping the one or more constituent words to one or more equivalence classes, and wherein equivalence classes are defined such that deviations from constituent words will also be considered acceptable in the event that the deviations are provided by the user in a subsequent authentication process; and
a set of acceptable variants of the normalized credential that will also be considered acceptable in the event that an acceptable variant in the set of acceptable variants is provided by the user in a subsequent authentication process, wherein generating the set of acceptable variants comprises determining a plurality of different combinations of subsets of the constituent words of the normalized credential; and
storing, in a credential set associated with the user identifier, a set of representations corresponding to at least some of the normalized credential and the set acceptable variants as stored enrolled credentials.

24. A method, comprising:
receiving, from a device operated by a user, input provided by the user comprising:
a user identifier; and
a credential comprising a plurality of separately parseable words;
parsing the credential into a set of constituent words;
accessing a credential set associated with the user identifier, stored during a previous enrollment process, comprising a set of representations corresponding to a set of stored enrolled credentials including at least some of a normalized credential and a set of acceptable variants of the normalized credential, wherein the set of acceptable variants comprise different combinations of subsets of the constituent words in the normalized credential; and authenticating, using a set of one or more processors, the received credential by performing a match, wherein performing the match comprises:

normalizing one or more of the set of constituent words to generate a normalized received credential to be verified, wherein normalizing comprises mapping the one or more constituent words to one or more equivalence classes, and wherein equivalence classes are defined such that deviations from constituent words previously provided by the user during the previous enrollment process will also be considered acceptable;

comparing one or more representations corresponding to the normalized received credential to be verified to the set of representations corresponding to the set of stored enrolled credentials;

and determining whether one of the one or more representations corresponding to the normalized received credential to be verified matches one of the set of representations corresponding to the set of stored enrolled credentials based on information associated with the constituent words; and granting the user access to a resource in the event that the match is determined to be successful.

* * * * *

UNITED STATES PATENT AND TRADEMARK OFFICE
CERTIFICATE OF CORRECTION

PATENT NO. : 9,137,238 B1
APPLICATION NO. : 13/025403
DATED : September 15, 2015
INVENTOR(S) : Jakobsson et al.

Page 1 of 1

It is certified that error appears in the above-identified patent and that said Letters Patent is hereby corrected as shown below:

On the title page item 73 Assignee, delete "RightQuestions" and insert --RightQuestion--, therefor.

Signed and Sealed this
Fifth Day of July, 2016

Michelle K. Lee
*Director of the United States Patent and Trademark Office*